US012453405B2

(12) United States Patent
Abed et al.

(10) Patent No.: US 12,453,405 B2
(45) Date of Patent: Oct. 28, 2025

(54) GRIP FOR A FOLDABLE ELECTRONIC DEVICE

(71) Applicant: PopSockets LLC, Boulder, CO (US)

(72) Inventors: Tark Abed, Boulder, CO (US); Alexander N. Dzigurski, Boulder, CO (US)

(73) Assignee: POPSOCKETS LLC, Boulder, CO (US)

( * ) Notice: Subject to any disclaimer, the term of this patent is extended or adjusted under 35 U.S.C. 154(b) by 686 days.

(21) Appl. No.: 17/377,697

(22) PCT Filed: Jan. 17, 2020

(86) PCT No.: PCT/US2020/014125
§ 371 (c)(1),
(2) Date: Jul. 16, 2021

(87) PCT Pub. No.: WO2020/150625
PCT Pub. Date: Jul. 23, 2020

(65) Prior Publication Data
US 2023/0140012 A1  May 4, 2023

Related U.S. Application Data

(60) Provisional application No. 62/906,361, filed on Sep. 26, 2019, provisional application No. 62/794,305, filed on Jan. 18, 2019.

(51) Int. Cl.
*A45F 5/00* (2006.01)
*F16M 13/04* (2006.01)
*H04M 1/04* (2006.01)

(52) U.S. Cl.
CPC .............. *A45F 5/00* (2013.01); *F16M 13/04* (2013.01); *H04M 1/04* (2013.01); *A45F 5/1516* (2025.01); *A45F 5/1525* (2025.01)

(58) Field of Classification Search
CPC ...... A45F 2200/0516; A45F 2200/0525; A45F 5/00; A45F 5/1516; A45F 5/1525;
(Continued)

(56) References Cited

U.S. PATENT DOCUMENTS 3,191,513 A  6/1965  Turner
4,601,361 A  7/1986  Nakada
(Continued)

FOREIGN PATENT DOCUMENTS

CN   101090617 B   12/2007
CN   201109605 Y    9/2008
(Continued)

OTHER PUBLICATIONS

Transmittal of the International Search Report and Written Opinion issued in PCT/US2020/014125 on Jul. 23, 2020.

*Primary Examiner* — Stephen A Vu
(74) *Attorney, Agent, or Firm* — Irell & Manella LLP

(57) ABSTRACT

An expandable device for attachment to a foldable electronic device having first and second surfaces includes a button and a pivotable frame member. The button has a top side, a bottom side, and a coupling portion and is movable between an expanded configuration and a collapsed configuration. The pivotable frame member is operably coupled to the button and includes a device coupling portion that engages a portion of the foldable electronic device. The pivotable frame member is pivotable between a first configuration whereby the button is positioned along at least one of the first surface or the second surface of the foldable electronic device and a second configuration whereby the button is positioned away from the foldable electronic device.

21 Claims, 10 Drawing Sheets

(58) Field of Classification Search
CPC ........ F16M 13/04; F16M 13/00; F16M 11/10; F16M 11/105; F16M 11/38; H04M 1/04; H04M 1/0214; H04M 1/21
See application file for complete search history.

(56) References Cited

U.S. PATENT DOCUMENTS

| | | | |
|---|---|---|---|
| 4,915,540 A | 4/1990 | Kennedy et al. | |
| 4,955,493 A | 9/1990 | Touzani | |
| 5,568,549 A | 10/1996 | Wang | |
| 5,752,834 A | 5/1998 | Ling | |
| 6,736,285 B2 | 5/2004 | Stewart-Stand | |
| 6,771,329 B2* | 8/2004 | Hung | G06F 1/1611 361/679.21 |
| 7,778,023 B1 | 8/2010 | Mohoney | |
| 8,509,865 B1 | 8/2013 | LaColla | |
| 8,688,037 B2 | 4/2014 | Chatterjee et al. | |
| 8,757,374 B1* | 6/2014 | Kaiser | G06F 1/166 248/346.03 |
| 9,301,584 B2* | 4/2016 | Butts | H05K 5/0086 |
| 9,397,719 B1 | 7/2016 | Schmidt | |
| 9,496,642 B1 | 11/2016 | Fan | |
| 10,113,691 B2 | 10/2018 | Grieve | |
| 10,200,518 B2 | 2/2019 | Richter | |
| 10,484,522 B1 | 11/2019 | McHatet | |
| 10,638,627 B1 | 4/2020 | Stime | |
| D883,273 S | 5/2020 | Chen | |
| 10,742,280 B2 | 8/2020 | Onggesanusi et al. | |
| 10,774,871 B1 | 9/2020 | Srour | |
| 10,897,984 B2 | 1/2021 | Roth | |
| 10,972,596 B1 | 4/2021 | Blau | |
| D921,359 S | 6/2021 | Roth | |
| D928,764 S | 8/2021 | Yeo | |
| 11,274,697 B2 | 3/2022 | Srour | |
| 2005/0277092 A1 | 12/2005 | Hwang | |
| 2007/0279852 A1 | 12/2007 | Daniel | |
| 2008/0315990 A1 | 12/2008 | Komatsu | |
| 2010/0038514 A1* | 2/2010 | Yu | G06F 1/1686 248/458 |
| 2010/0222110 A1 | 9/2010 | Kim et al. | |
| 2010/0321899 A1 | 12/2010 | Vossoughi et al. | |
| 2011/0036876 A1 | 2/2011 | Fathoullahi | |
| 2012/0042476 A1* | 2/2012 | Karmatz | B25G 1/102 16/421 |
| 2012/0043452 A1 | 2/2012 | Karmatz | |
| 2012/0138647 A1 | 6/2012 | Norling | |
| 2013/0003984 A1 | 1/2013 | Belfonte et al. | |
| 2013/0039015 A1 | 2/2013 | Li | |
| 2013/0177304 A1 | 7/2013 | Chapman | |
| 2015/0029352 A1* | 1/2015 | Burciaga | H04M 1/04 348/376 |
| 2015/0076020 A1 | 3/2015 | Smith | |
| 2015/0144754 A1 | 5/2015 | ElHarar | |
| 2015/0354747 A1 | 12/2015 | Jennings | |
| 2016/0069512 A1 | 3/2016 | Grieve | |
| 2016/0070156 A1 | 3/2016 | Alster | |
| 2016/0166056 A1 | 6/2016 | Le | |
| 2016/0249472 A1 | 8/2016 | Tu | |
| 2016/0373152 A1 | 12/2016 | Schmidt | |
| 2017/0108167 A1* | 4/2017 | Fan | F16M 11/10 |
| 2017/0195000 A1 | 7/2017 | Srour | |
| 2018/0004250 A1 | 1/2018 | Barnett et al. | |
| 2018/0051851 A1 | 2/2018 | Hobbs | |
| 2018/0146078 A1 | 5/2018 | Shin | |
| 2018/0262603 A1 | 9/2018 | Richter | |
| 2018/0335178 A1 | 11/2018 | Bin et al. | |
| 2018/0348541 A1 | 12/2018 | Radzwill | |
| 2019/0281961 A1 | 9/2019 | Peterson | |
| 2020/0093231 A1 | 3/2020 | Mora et al. | |
| 2020/0162594 A1 | 5/2020 | Cantoli-Alves | |
| 2020/0299030 A1 | 9/2020 | Fromme | |
| 2020/0326030 A1 | 10/2020 | Surani et al. | |
| 2020/0328017 A1 | 10/2020 | Isenberg | |
| 2020/0329133 A1 | 10/2020 | Surani et al. | |
| 2021/0231970 A1 | 7/2021 | Radzwill | |
| 2022/0103367 A1 | 3/2022 | Yalagandula | |

FOREIGN PATENT DOCUMENTS

| | | |
|---|---|---|
| CN | 101512459 B | 8/2009 |
| CN | 106 979 448 A1 | 7/2017 |
| JP | H1155378 A | 2/1999 |
| WO | 2011035512 A1 | 3/2011 |
| WO | 2012016158 A2 | 2/2012 |
| WO | 2012125690 A1 | 9/2012 |
| WO | 2015036728 A1 | 3/2015 |
| WO | 2015063666 A1 | 5/2015 |
| WO | 2017044622 A1 | 3/2017 |
| WO | 2018035349 A1 | 2/2018 |
| WO | 2018187278 A1 | 10/2018 |
| WO | 2021154760 A1 | 8/2021 |

\* cited by examiner

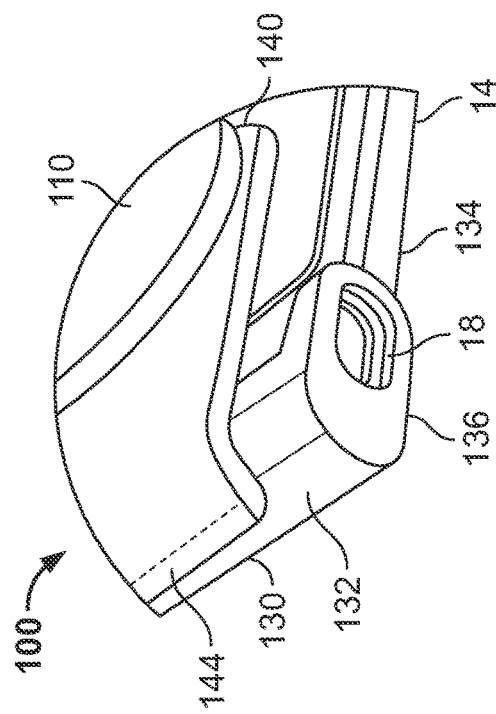
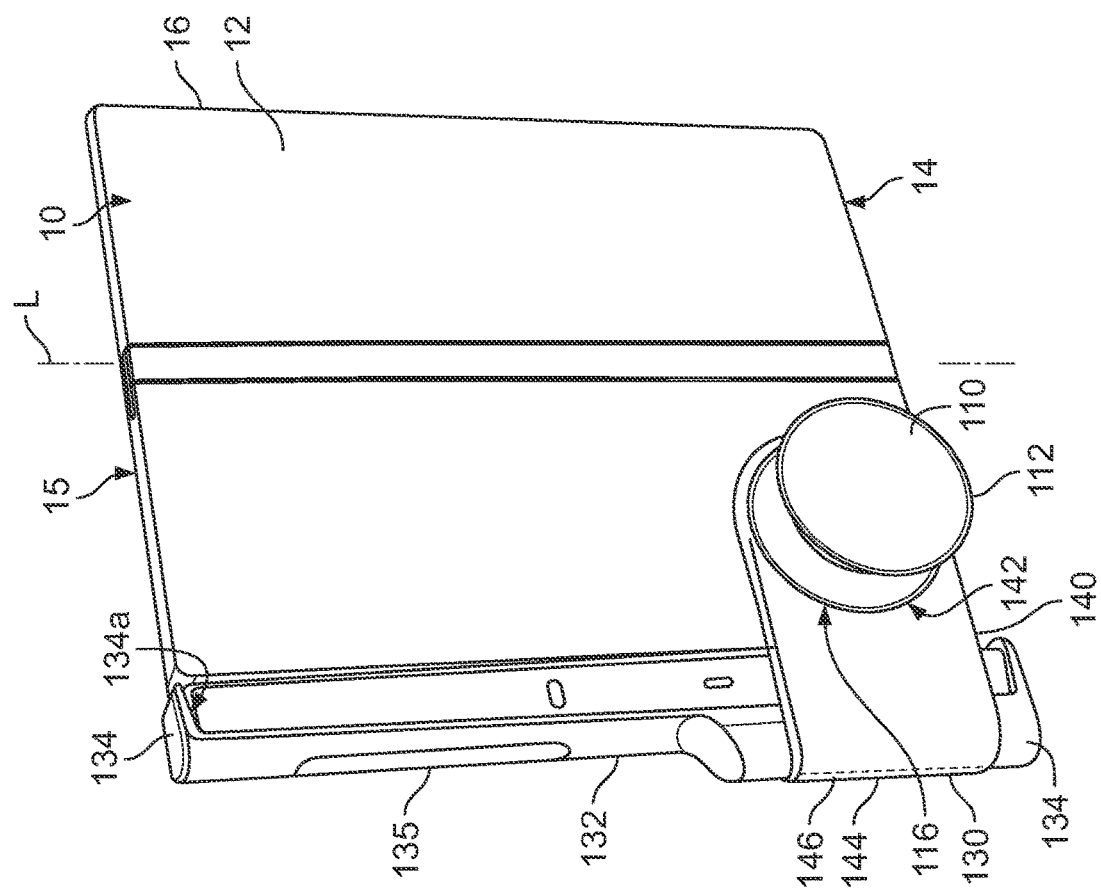

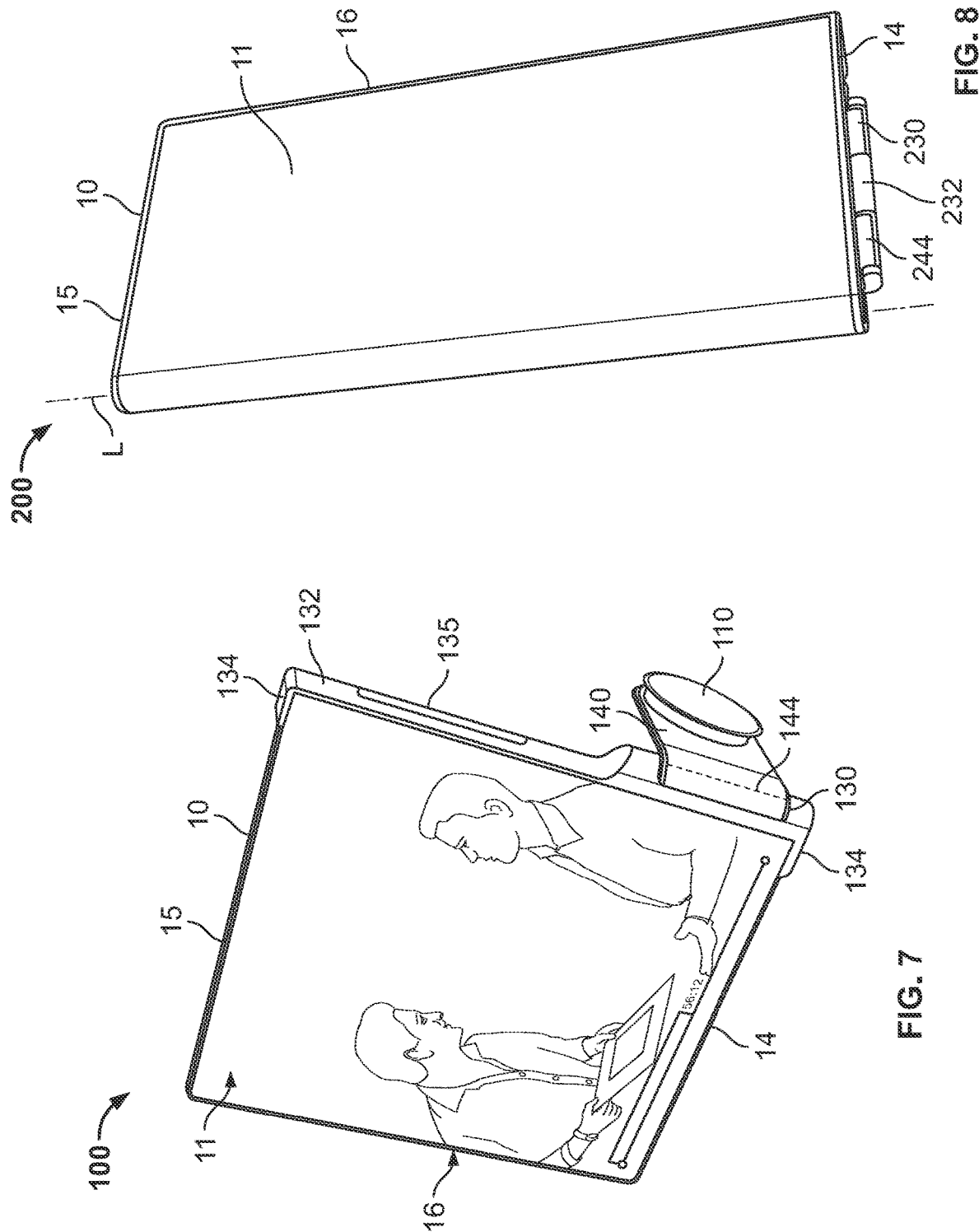

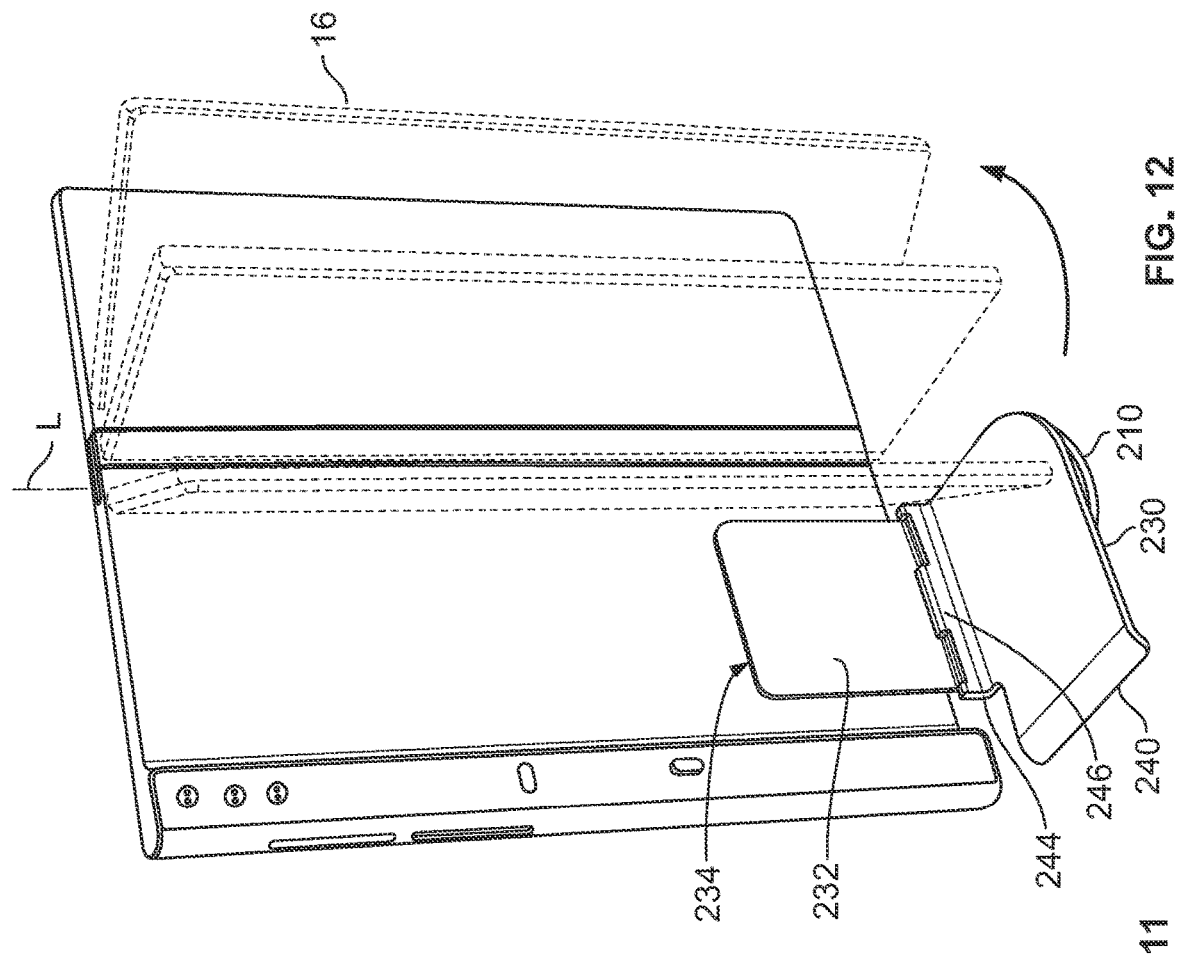
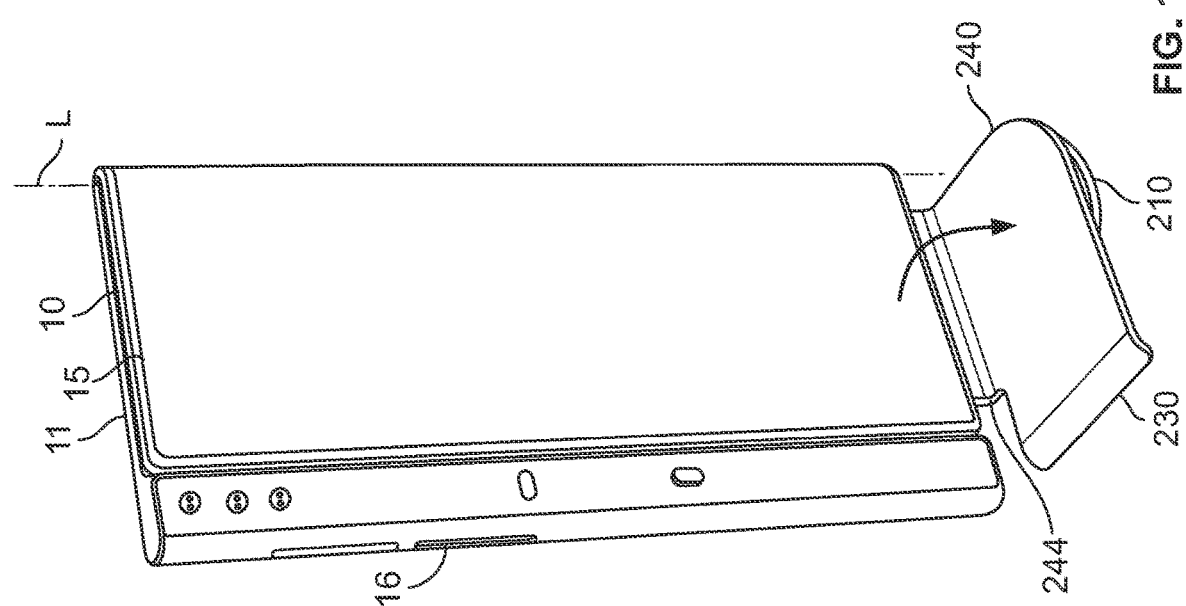

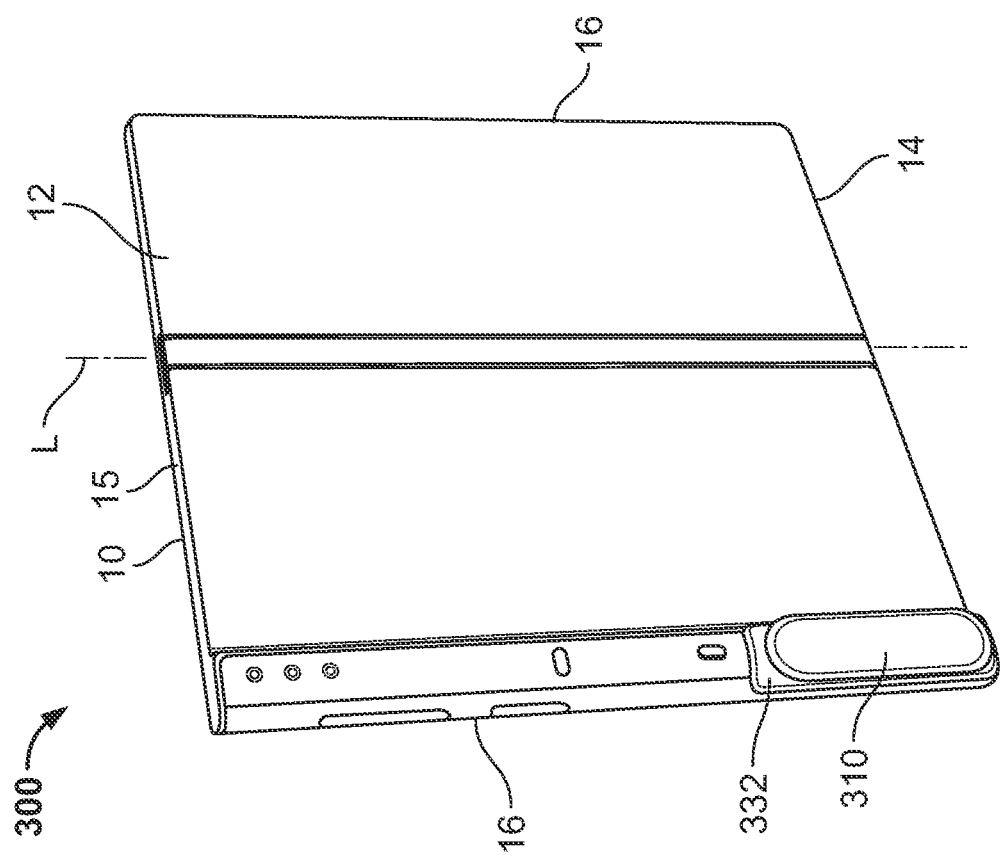
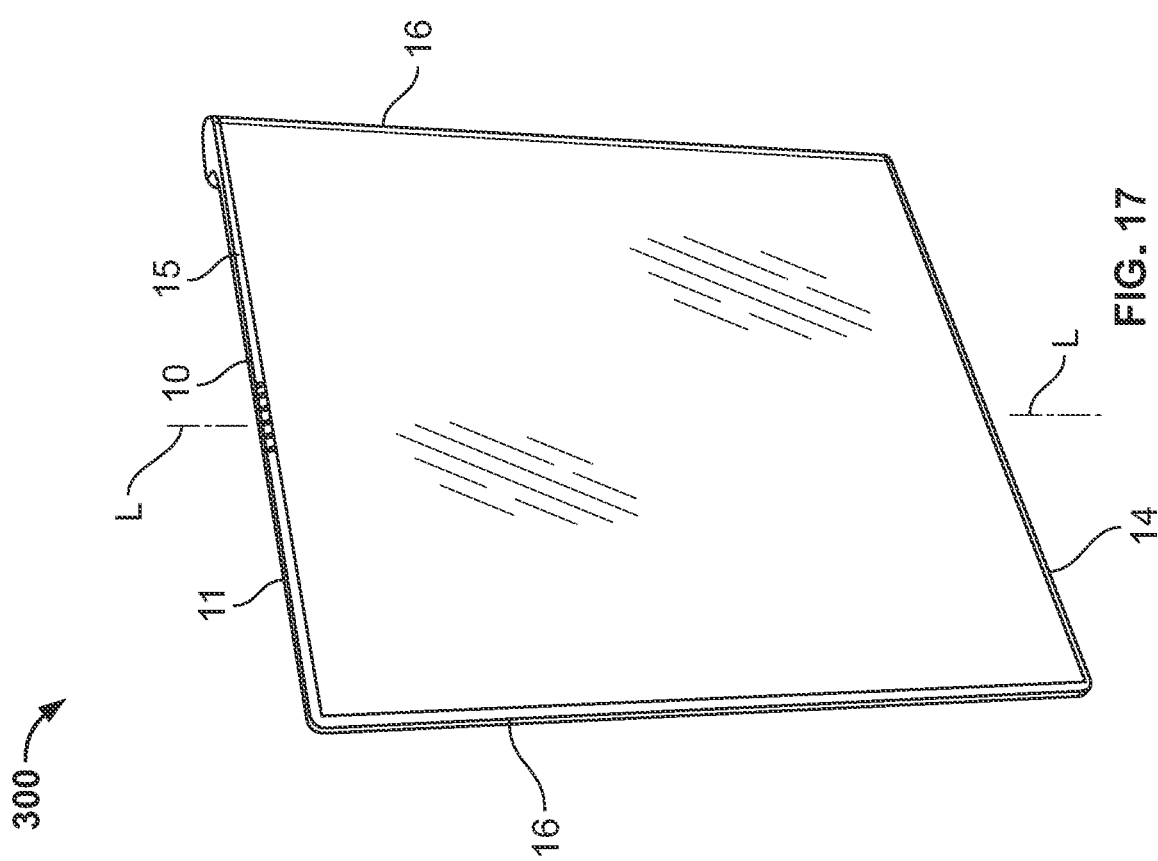

GRIP FOR A FOLDABLE ELECTRONIC DEVICE

PRIORITY CLAIM

This application is a National Stage of International Application No. PCT/US20/14125, filed Jan. 17, 2020, which claims priority to U.S. Provisional Patent Application No. 62/794,305, filed Jan. 18, 2019, and U.S. Provisional Patent Application No. 62/906,361, filed Sep. 26, 2019, the entire contents of each of which are hereby incorporated herein by reference.

FIELD OF THE DISCLOSURE

The present disclosure generally relates to expandable devices and, more particularly, to expandable devices that can be attached to a foldable electronic device or a case for a foldable electronic device and used as a grip, a stand, or for other purposes.

BACKGROUND

Portable electronic devices, such as tablets and smart phones, are often housed in protective covers or cases in order to protect the device from damage, to provide a grip for handling the device, and/or to provide a stand for propping the device on a surface. Expandable devices and accessories, which may be attached directly to the device or to the case protecting the device, are used for a variety of functions, including propping the device on a surface and providing an expandable grip for handling the device. The expandable devices are typically positioned on and/or coupled to a rear surface of the portable electronic device to allow a user to securely grip the device, and may have decorative buttons, which may display logos, decals, symbols, or other artistic renderings. In some cases, portable electronic devices may include folding and/or expanding mechanisms that can selectively modify an overall configuration and/or dimension of the device. Such mechanisms may hinder and/or limit placement of the expandable accessory devices. Further, as foldable electronic devices become increasingly common, technological advancements such as additional sensors, cameras and/or lens arrays, and the like may be positioned at varying locations on the device that may potentially impact placement of the accessory device.

SUMMARY

In accordance with some examples, an expandable device for attachment to a foldable electronic device having first and second surfaces includes a button and a pivotable frame member. The button has a top side, a bottom side, and a coupling portion and is movable between an expanded configuration and a collapsed configuration. The pivotable frame member is operably coupled to the button and includes a device coupling portion that engages a portion of the foldable electronic device. The pivotable frame member is pivotable between a first configuration whereby the button is positioned along at least one of the first surface or the second surface of the foldable electronic device and a second configuration whereby the button is positioned away from the foldable electronic device.

In some approaches, the pivotable frame member further includes a base member that carries the device coupling portion and a pivotable arm pivotably coupled to the base member. The button is operably coupled to the pivotable arm. Further, in some examples, the expandable device can include a locking mechanism operably coupled to at least one of the base member or the pivotable arm. The locking mechanism selectively retains the pivotable frame member in at least one of the first configuration or the second configuration. In some forms, the locking mechanism may be in the form of a resilient member. In some examples, when the pivotable frame member is in the second configuration, the expandable device may retain the foldable electronic device in an upright position.

In some examples, the device coupling portion of the pivotable frame member is adapted to secure to a side surface of the foldable electronic device. Further, the base member may include an elongated member having a length corresponding to a height dimension of the foldable electronic device. The base member may secure to the foldable electronic device via a friction fit coupling. In some examples, an electrical pass through member may be coupled to the base member.

In some of these examples, the device coupling portion of the pivotable frame member is adapted to secure to at least one of the first surface or the second surface of the foldable electronic device. Further, the base member may be adapted to secure to the foldable electronic device via an adhesive coupling.

In any of these examples, the pivotable arm may be removably coupled to the base member.

In accordance with other examples, an expandable device for attachment to a foldable electronic device having first and second surfaces includes an elongated button and an elongated base member. The elongated button has a top side, a bottom side, and a coupling portion. The coupling portion is movable between an expanded configuration and a collapsed configuration. The elongated base member is operably coupled to the coupling portion of the button, and includes a device coupling portion that can engage a portion of the foldable electronic device.

BRIEF DESCRIPTION OF THE DRAWINGS

The above needs are at least partially met through provision of the grip for a foldable electronic device described in the following detailed description, particularly when studied in conjunction with the drawings, wherein:

FIG. 5 illustrates a rear perspective view of the example expandable device of FIGS. 1-4 coupled to the foldable electronic device in an unfolded state while the example expandable device is in the first configuration;

FIG. 6 illustrates a zoomed-in view of the example expandable device of FIGS. 1-5;

FIG. 7 illustrates a right side perspective view of the example expandable device of FIGS. 1-6 in the second configuration;

FIG. 8 illustrates a front perspective view of another example expandable device coupled to a foldable electronic device in a first configuration;

FIG. 11 illustrates a rear perspective view of the example expandable device of FIGS. 8-10 coupled to a foldable electronic device in a second configuration;

FIG. 12 illustrates a rear perspective view of the example expandable device of FIGS. 8-11 coupled to the foldable electronic device in a transitory state while the example expandable device is in the second configuration;

FIG. 17 illustrates a front perspective view of the third example expandable device of FIGS. 14-16 coupled to a foldable electronic device in an unfolded state;

FIG. 18 illustrates a rear perspective view of the example expandable device of FIGS. 14-17 coupled to a foldable electronic device in an unfolded state;

Figure 1:
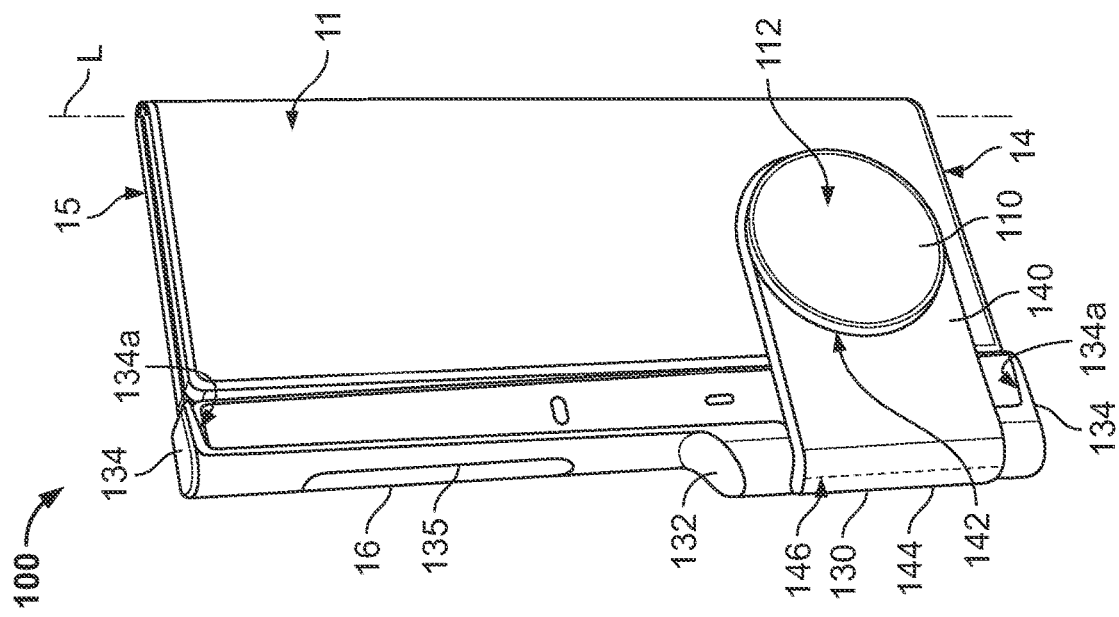
FIG. 1 illustrates a right side perspective view of an example expandable device coupled to a foldable electronic device while being in a first configuration.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various versions of the present invention. Also, common but well-understood elements that are useful or necessary in a commercially feasible version are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, expandable devices for foldable electronic devices are provided that include a platform or frame member and a button that is movable relative to the frame member between a collapsed configuration and an expanded configuration. Traditionally, these expandable devices are positioned on and/or coupled to a rear surface of the foldable electronic device and allow a user to securely grip the device. The expandable device further may act as a stand or platform for the device as well as function as a cord-retention mechanism for headphones or other cables.

Foldable portable electronic devices may be configured to fold backwards, such that the rear surface of the device becomes sandwiched between the front surface. In other cases, foldable portable devices are configured to open in a wallet-type manner. In still other cases, foldable portable devices may be configured to change form in response to a bending- or folding-force applied by the user. In each of these case, such bending or folding creates handling, ergonomic and/or weight-distribution challenges for the user. To that end, one aspect of the disclosure is to provide an expandable device that is configured to be effectively used as a grip, a stand, or to otherwise facilitate handling of foldable portable electronic devices. For example, the expandable devices described herein allows a button, usable as a grip, to move to various locations or regions of the expandable device in order to be positioned outside of the physical space occupied by the foldable portable electronic device when in the folded position. In other words, the expandable devices described herein accommodate for the folding of the device, and may still be used as a gripping and/or storage mechanism when the device is in the folded position.

With reference now to the figures, one example of an expandable device 100 coupled to a foldable electronic device 10 is shown in FIGS. 1-7. Briefly, the foldable electronic device 10 includes a front surface 11 that includes a screen or display, a rear surface 12 (FIGS. 4 and 5), a lower surface 14, an upper surface 15, and side surfaces 16. Each of the lower surface 14, the upper surface 15, and the side surfaces 16 extend between the front and rear surfaces 11, 12. The foldable electronic device 10 may be in the form of a foldable cellular telephone having a foldable screen or screens disposed on the front surface 11 that may be selectively bifurcated in a manner that reduces the overall screen size by approximately half or any other fraction. The foldable electronic device 10 may use any number of folding mechanisms to cause the device to be folded about a folding axis L.

Figure 19:
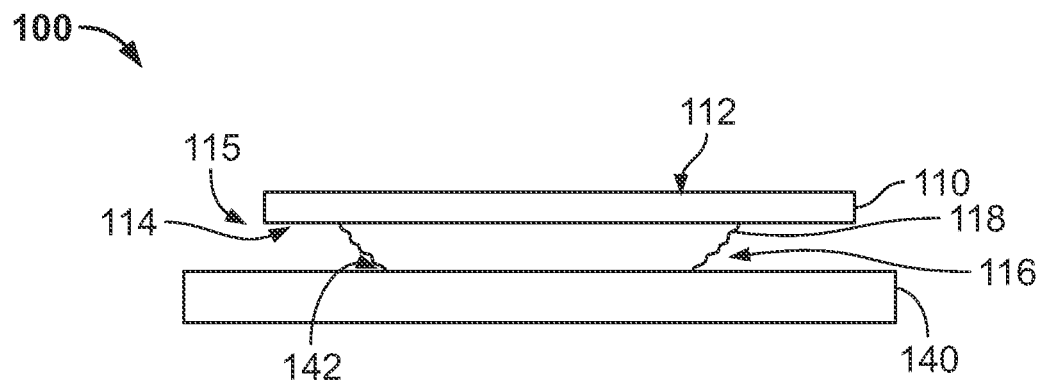
FIG. 19 illustrates a side elevation view of an example expandable device in a collapsed configuration.
Figure 20:
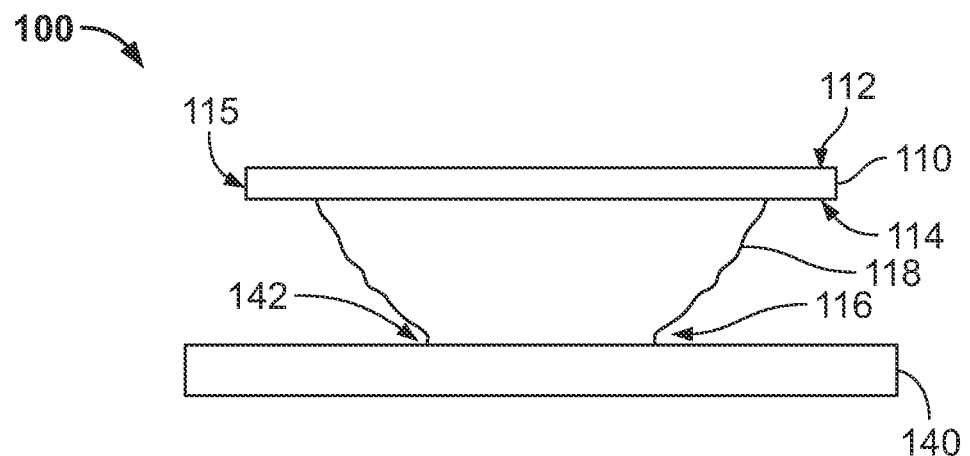
FIG. 20 illustrates a side elevation view of the example expandable device of FIG. 20 in an expanded configuration.

As illustrated in FIGS. 1-7, 19, and 20, The expandable device 100 includes a button 110 having a top side 112, a bottom side 114, and a coupling portion 116, and further includes a pivotable frame member 130 having a base member 132 and a pivotable arm 140 coupled thereto. As illustrated in FIGS. 19 and 20, the coupling portion 116 of the button 110 further includes a collapsible and/or expandable mechanism 118 operably coupled to the button 110. In the illustrated example, the coupling portion 116 is carried by, formed integrally with, and/or attached to the expandable mechanism 118 to selectively release or couple the button 110 to the pivotable frame member 130, and, more specifically, to the pivotable arm 140.

The expandable mechanism 118 generally facilitates movement of the accessory device 100 between an expanded configuration and a collapsed configuration, and acts to retain the accessory device 100 in the desired configuration (expanded or collapsed) when coupled to a portable electronic device such as the foldable electronic device 10. The expandable mechanism 118 may take the form of an outer case, enclosure, shell, deformable cover, etc., and may include a resilient member (e.g., a bistable coil spring) that is arranged between the button 110 and the pivotable arm 140.

As previously noted, the button 110 includes the top or upper side 112, the bottom or inner side 114, and further includes a rim or edge 115. The button 110 is operably coupled to the expandable mechanism 118. The button 110 may have an annular shape. In other examples, however, the button 110 may have a rectangular, square, triangular, irregular, or other shape. The button 110 is preferably constructed from metal or plastic material, though other suitable materials can be used.

As stated, the button 110 is removable from the expandable device 100, and may be selectively secured to the pivotable arm 140 of the expandable device 100. The button 110 may have artistic value (e.g., the button 110 may include an artistic rendering, a logo, a symbol, text, or a decal), the button 110 may provide a grip that allows a user to slide their fingers between the bottom side 114 and the pivotable arm 140 when the expandable mechanism 118 is in the expanded configuration (when, for example, the button 110 is coupled to the foldable electronic device 10) such that the top side 112 of the button 110 is disposed adjacent to the palm of the user's hand, and may also provide a space in which a cord, such as a cord for earphones, may be wrapped and stored around a portion of the expandable mechanism 118 and/or the pivotable arm 140.

Generally, the expandable mechanism 118 is used to move from the expanded configuration to the collapsed configuration by overcoming any biasing forces applied by resilient members. This may be accomplished by grabbing or grasping the button 110 and moving (e.g., pushing) the button 110 towards the pivotable arm 140. The expandable device 100 may include any number of retaining components and/or locking mechanisms to maintain the expandable device 100 in the collapsed configuration. The button 110 may be positioned in the expanded configuration by grasping or pulling the button 110 away from the pivotable arm 140 with a sufficient force to overcome the force of any retaining components used to secure the expandable device 100 in the collapsed configuration. Upon doing so, if the expandable device 100 is equipped with a resilient member or members, the button 110 will be urged towards, and maintained in, an expanded configuration.

Returning to FIGS. 1-7, the pivotable frame member 130 may have any desired shape (e.g., an elongated, generally rectangular shape) and is preferably constructed from a metal or a plastic material, though other suitable materials (e.g., cardboard) can be used. Generally speaking, the base member 132 is dimensioned to avoid interference with any electronic components such as, for example, sensors, speakers, camera modules, etc. disposed near the edge 16 of the foldable electronic device 10. In the illustrated example, the base member 132 includes a device coupling portion in the form of a finger or fingers 134 that extend or protrude outwardly from the base member 132. The fingers 134 may define a cavity 134a in which a portion of the side surface 16 of the foldable electronic device 10 may be at least partially disposed. The base member 132 may have an overall length (or any other dimension) that corresponds to an overall height (or any other dimension) of the foldable electronic device 10. As such, the finger or fingers 134 may be positioned to create a frictional coupling between the base member 132 and the foldable electronic device 10 to secure the base member 132 to the foldable electronic device 10. Other types of couplings such as adhesives, notches, and the like may be used. The base member 132 may further include an opening or slot 135 positioned to allow controls (e.g., a power button, a volume button or buttons, etc.) disposed on the foldable electronic device 10 to be accessed.

The pivotable arm 140 includes a button coupling portion 142 and a hinge portion 144. In some examples, the button coupling portion 142 may be in the form of an opening that engages the coupling portion 116 of the button 110. In other examples, the button coupling portion 142 may be in the form of a quick release mechanism (not illustrated) that allows the button 110 to releasably couple with the pivotable arm 140. Other examples and configurations are possible.

In some approaches, the hinge portion 144 may be in the form of a curved portion corresponding to a curvature of the base member 132, or may include a hinge assembly that allows the pivotable arm 140 to pivot relative to the base member 132. In either of these examples, the hinge portion 144 may include a release mechanism that allows the pivotable arm 140 to be decoupled from the base member 132. In some examples, all or a portion of the hinge assembly may be carried by the base member 132.

Figure 2:
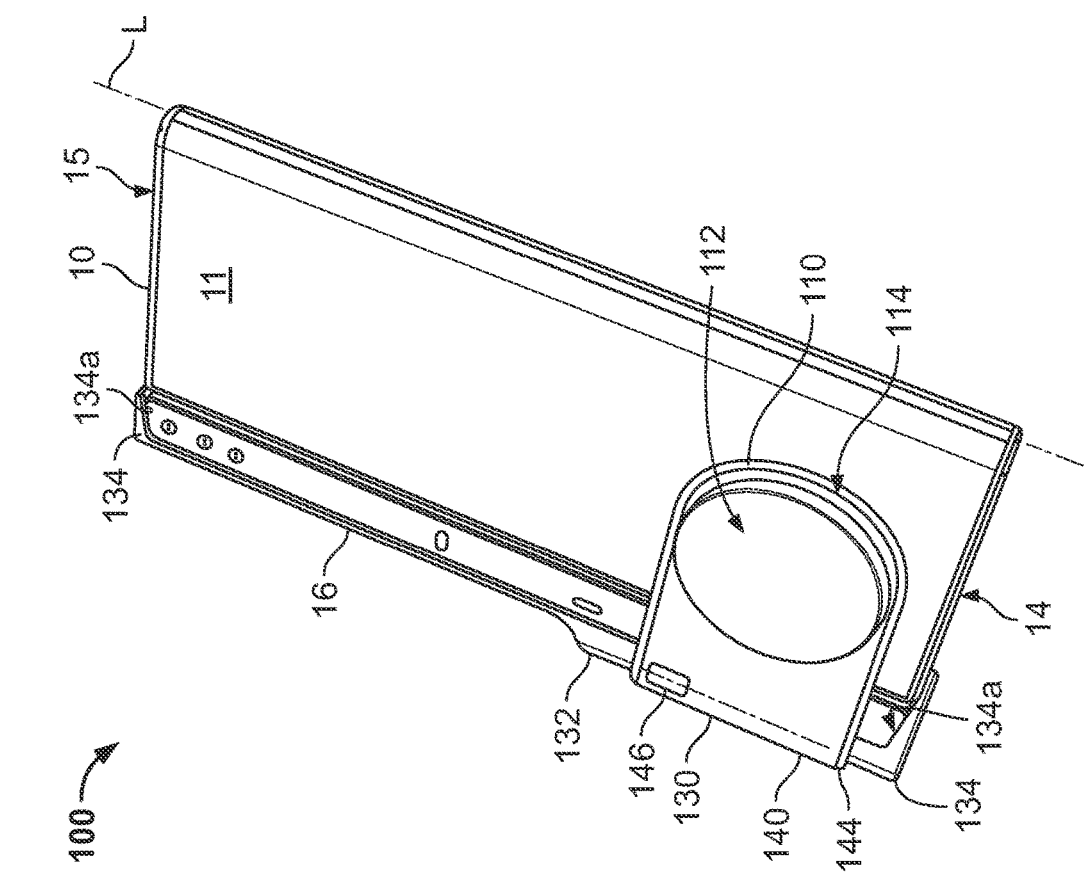
FIG. 2 illustrates a left side perspective view of the expandable device of FIG. 1 in the first configuration.
Figure 4:
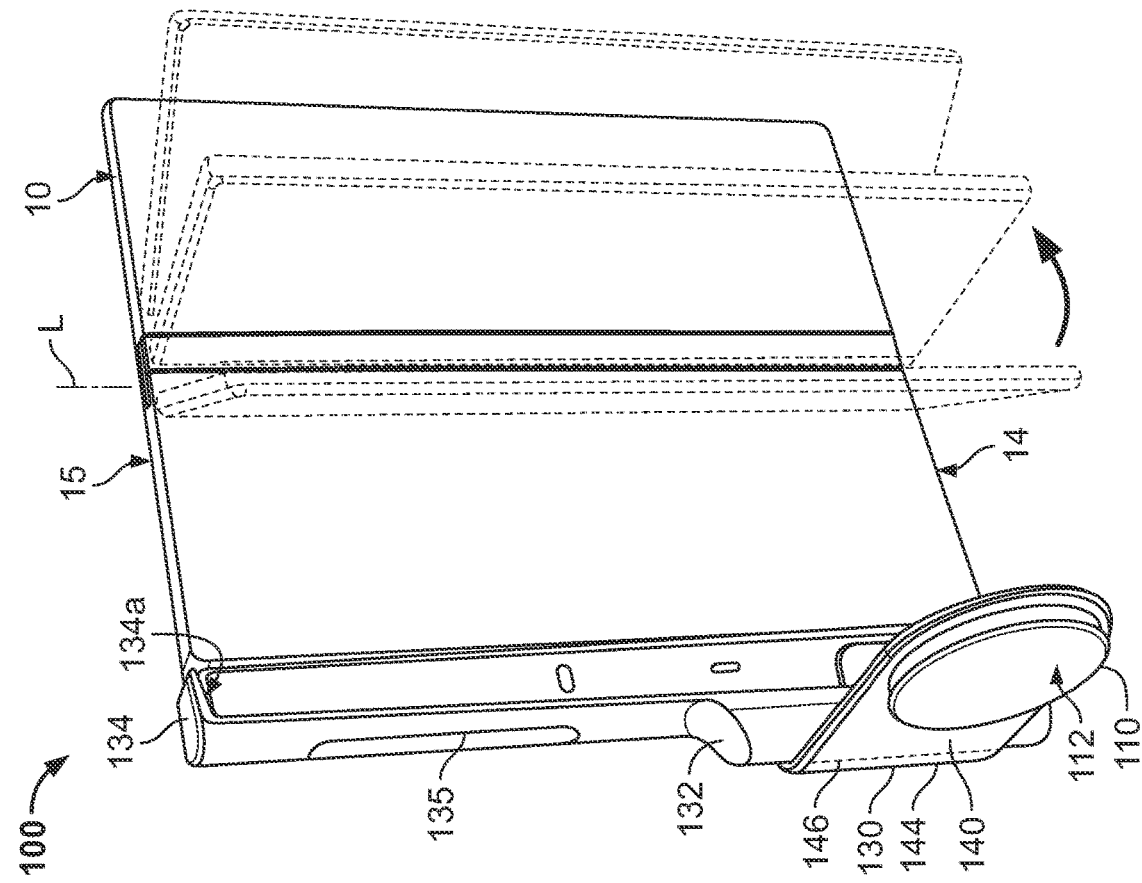
FIG. 4 illustrates a rear perspective view of the expandable device of FIGS. 1-3 coupled to the foldable electronic device in a transitory state while the expandable device is in the second configuration.
Figure 3:
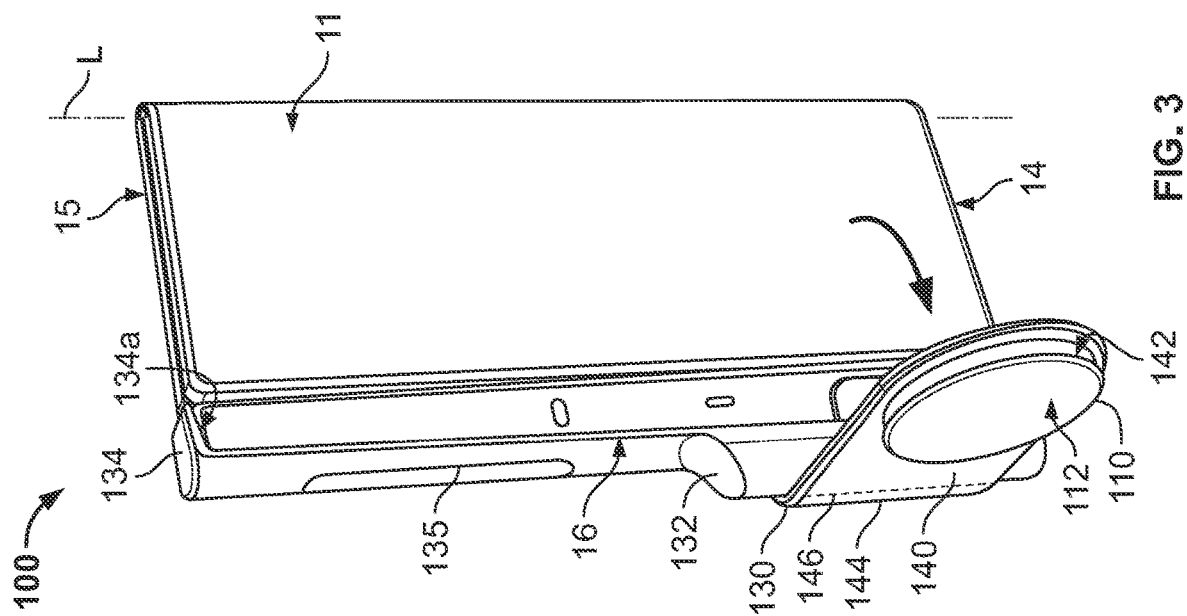
FIG. 3 illustrates a left side perspective view of the expandable device of FIGS. 1 and 2 while being in a second configuration.
Figure 10:
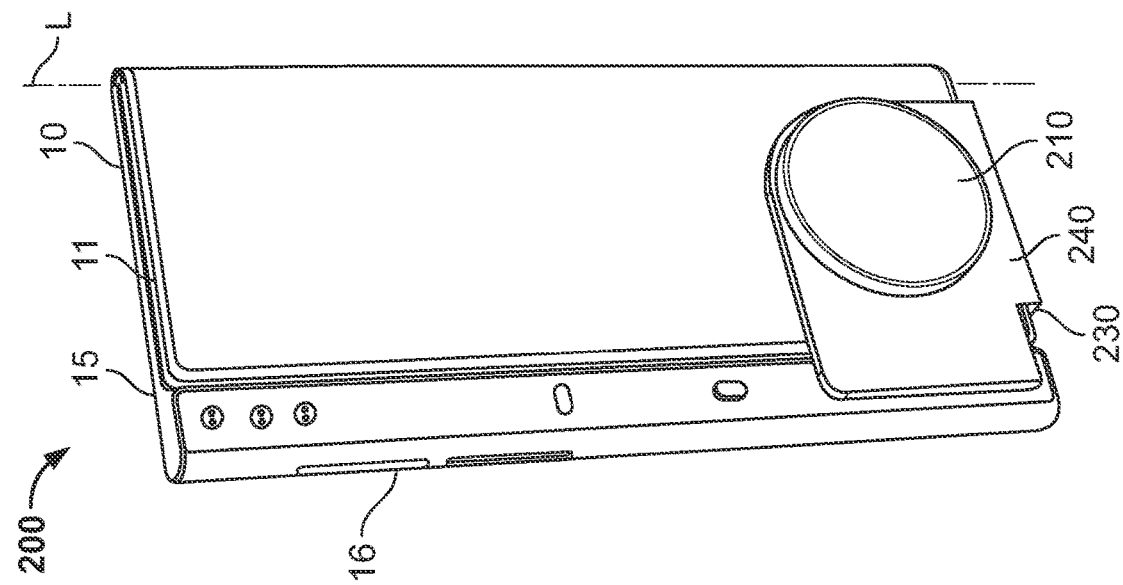
FIG. 10 illustrates a rear perspective view of the example expandable device of FIGS. 8 and 9 coupled to a foldable electronic device in the first configuration.
Figure 9:
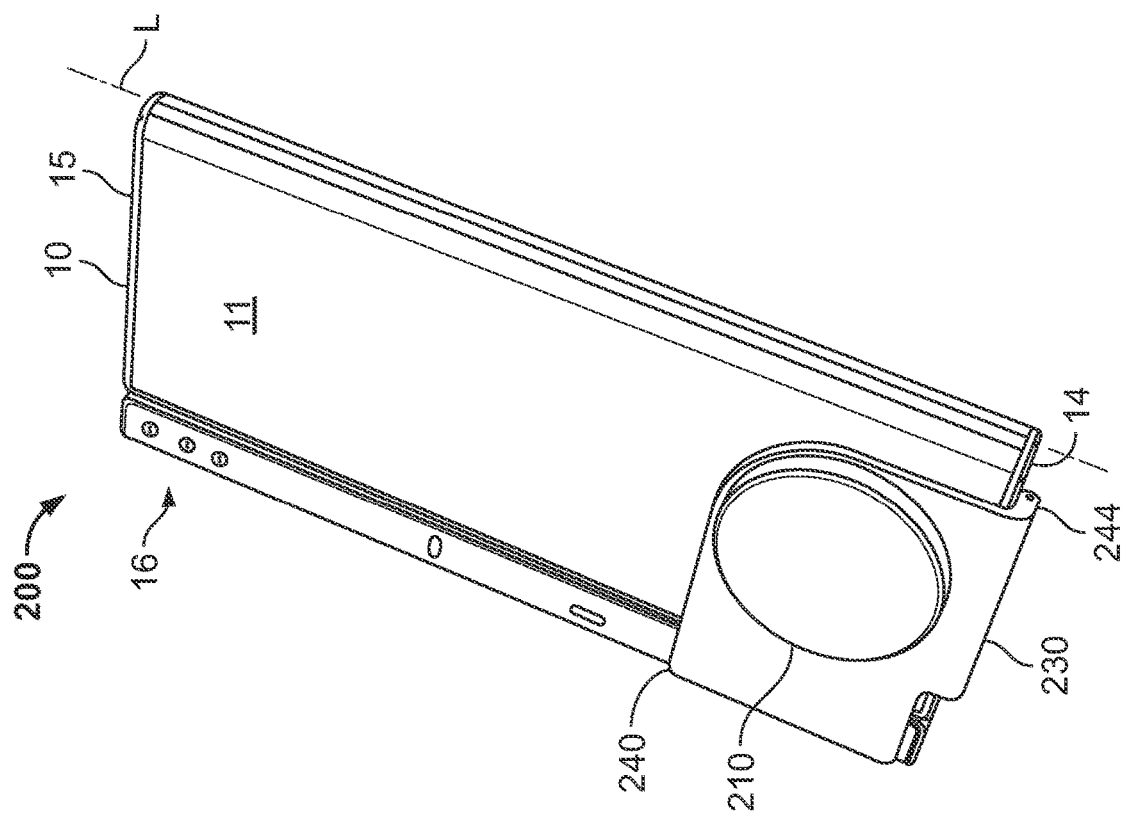
FIG. 9 illustrates a rear perspective view of the example expandable device of FIG. 8 coupled to a foldable electronic device while being in a first configuration
Figure 14:
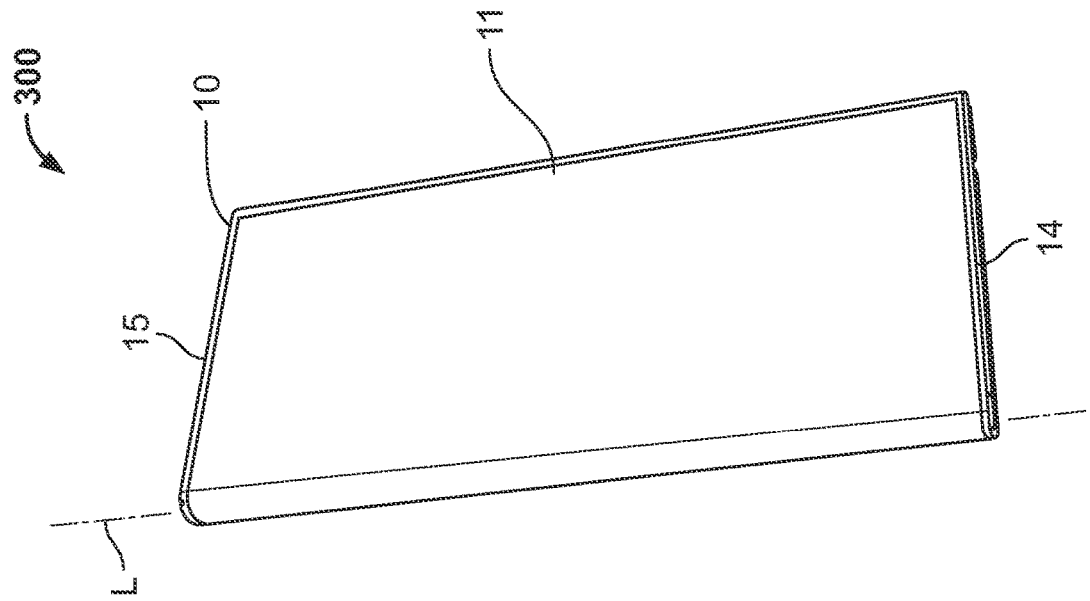
FIG. 14 illustrates a front perspective view of another example expandable device coupled to a foldable electronic device.
Figure 13:
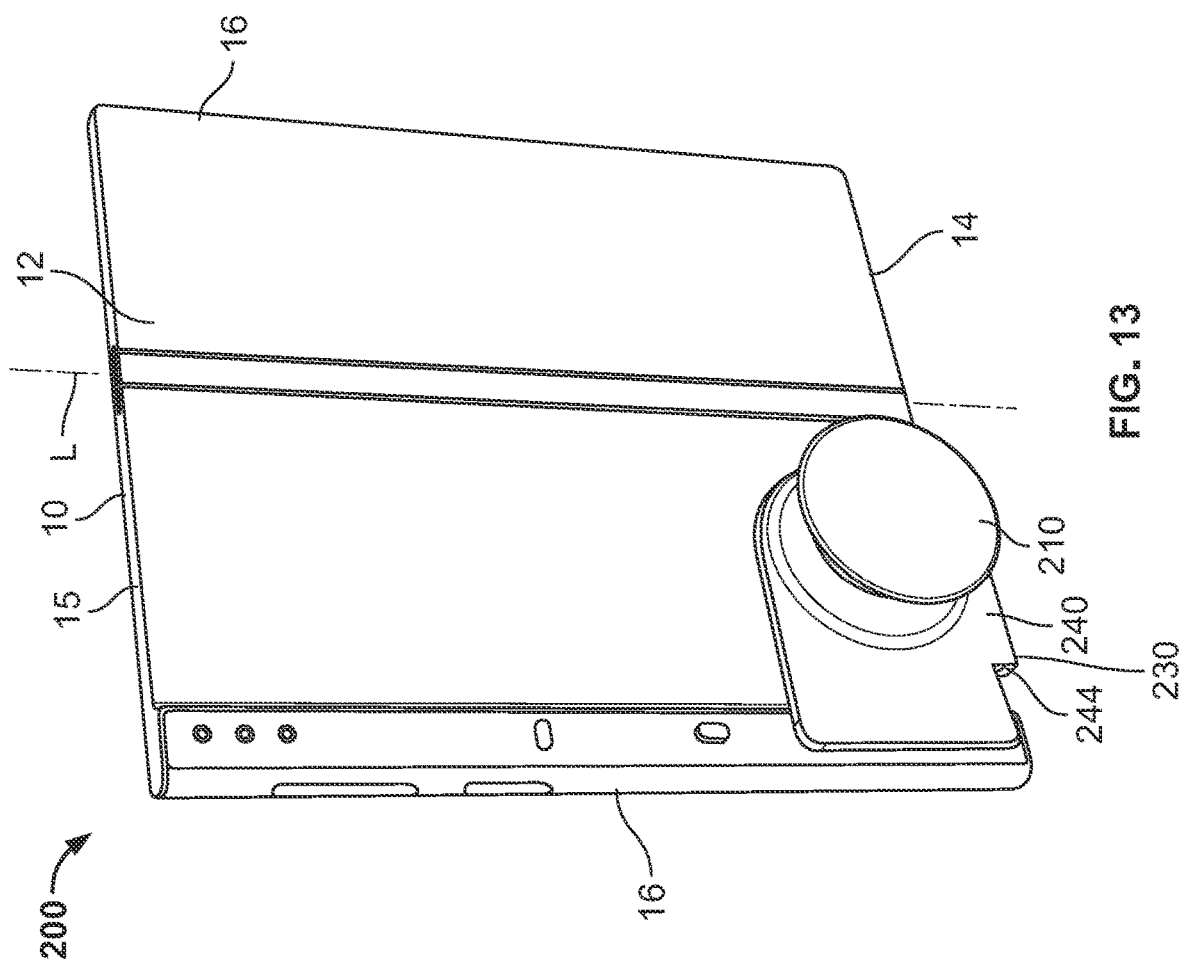
FIG. 13 illustrates a rear perspective view of the example expandable device of FIGS. 8-12 coupled to the foldable electronic device in an unfolded state while the example expandable device is in the first configuration.
Figure 16:
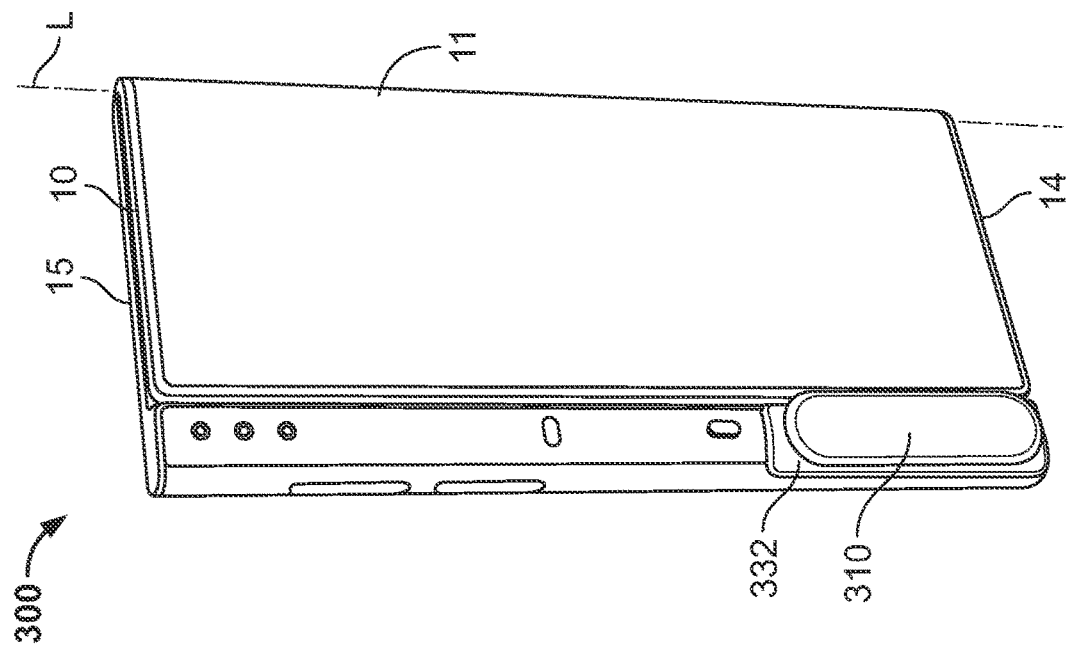
FIG. 16 illustrates a rear perspective view of the example expandable device of FIGS. 14 and 15 coupled to a foldable electronic device while being in a collapsed configuration.
Figure 15:
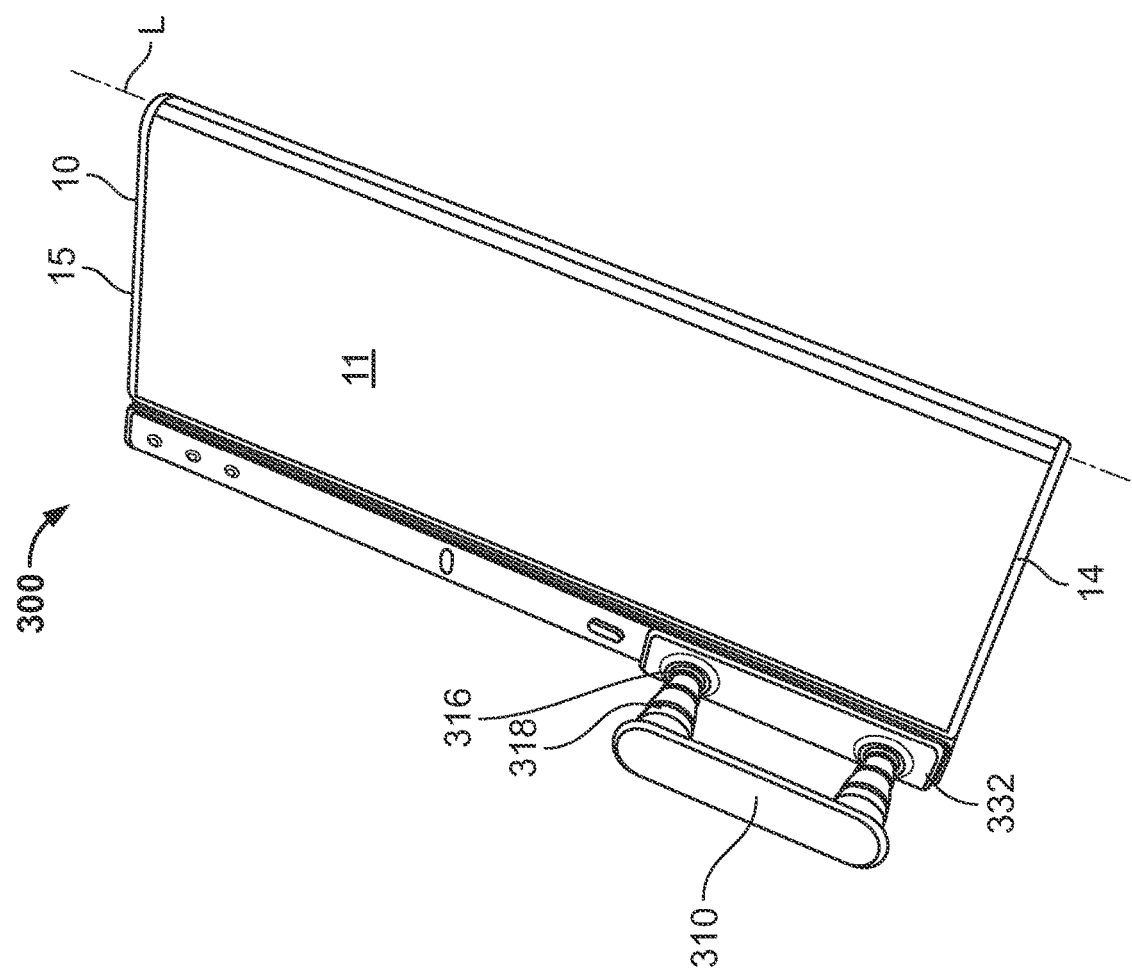
FIG. 15 illustrates a rear perspective view of the example expandable device of FIG. 14 coupled to a foldable electronic device while being in an expanded configuration.

The pivotable arm 140 is pivotable between a first configuration (FIGS. 1, 2, and 5) and a second configuration (FIGS. 3, 4, and 7). When the pivotable arm 140 is in the first configuration, the pivotable arm 140, and thus the button 110, is positioned adjacent to and/or near the foldable electronic device 10 (e.g., the front surface 11 or the rear surface 12). As previously stated, the button 110 may be positioned in an expanded or a collapsed configuration as desired. So configured, and as illustrated in FIGS. 1 and 2, a user may hold the button 110, and thus the foldable electronic device 10 while the foldable electronic device 10 is in a folded state. In some examples, the pivotable arm 140 may act as a securement mechanism that restricts and/or prevents the foldable electronic device 10 from moving to an unfolded configuration.

When the user wishes to unfold the foldable electronic device 10, as illustrated in FIG. 3, the user may pivot the pivotable arm 140 to the second configuration. In this second configuration, the pivotable arm 140 no longer restricts and/or prevents the foldable electronic device 10 from being unfolded, as the pivotable arm 140 provides ample clearance for the foldable electronic device 10 to move between folded and unfolded configurations as shown in FIG. 4. Upon the foldable electronic device 10 being unfolded, the pivotable arm 140 may be positioned in either the first configuration (FIG. 5) or the second configuration (FIG. 6) as desired. When the pivotable arm 140 is positioned in the first configuration, a user may grasp the button 110 to securely hold the foldable electronic device 10. Additionally, when the pivotable arm 140 is positioned in the second configuration, the pivotable arm 140 may serve as a kickstand to prop and/or retain the foldable electronic device 10 in an upright position.

In some examples, the hinge portion 144 may additionally include a locking mechanism 146 which may be operably coupled to the base member 132 and/or the pivotable arm 140. The locking mechanism 146 selectively retains the pivotable arm in the first and/or the second configurations. For example, the locking mechanism 146 may be in the form of a resilient member that exerts an urging force on the pivotable arm 140 that retains the pivotable arm 140 in either the first and/or the second configuration. In some examples, the resilient member may be a bistable element that selectively exerts opposing forces to retain the pivotable arm 140 in the first and second configurations. Other examples are possible.

In some examples, the expandable device 100 may include any number of additional features. For example, as illustrated in FIG. 6, the base member 132 may include an electrical pass through 136, which may be used to allow the device to be charged when using the expandable device 100. The electrical pass through 136 may include an internal connector (not illustrated) that is inserted into a charging port 18 on the foldable electronic device 10. The electrical pass through 136 may include any number of electrical and/or mechanical components that assist in supplying a power source to the foldable electronic device 10. Further, in some examples, the base member 132 may carry a battery or a battery pack that may provide a power source to the foldable electronic device 10. Other examples are possible.

Another example of an expandable device 200 coupled to a foldable electronic device is illustrated in FIGS. 8-13. It will be appreciated that the expandable device 200 illustrated in FIGS. 8-13 may include similar features to the expandable device 100, and accordingly, elements illustrated in FIGS. 8-13 are designated by similar reference numbers indicated in FIGS. 1-7 increased by 100. Accordingly, these features will not be described in substantial detail. Further, it is appreciated that any of the elements described with regards to the expandable device 100 may be incorporated into the expandable device 200.

The base member 232 of pivotable frame member 230 is in the form of a generally flat, planar member having a coupling portion in the form of a facing surface 234 that couples to the rear surface 12 of the foldable electronic device 10. In some examples, an adhesive may be used to secure the facing surface 234 of the base member 232 to the rear surface 12 of the foldable electronic device 10. Other examples of suitable coupling approaches are possible.

In the illustrated example, the base member 232 is positioned such that the hinge portion 244 is disposed at or near the lower surface 14 of the foldable electronic device 10. In other examples (not shown), the hinge portion 244 may be disposed at or near the upper surface 12 or one of the side surfaces 16. In any of these examples, the pivotable arm 240, which may be removably coupled with the base member 232, is movable between a first configuration (FIGS. 9, 10, and 13) whereby the pivotable arm 240, and thus the button 210, is positioned adjacent to and/or near the foldable electronic device 10 (e.g., the front surface 11 or the rear surface 12). As previously stated, the button 210 may be positioned in an expanded or a collapsed configuration as desired. So configured, a user may hold the button 210, and thus the foldable electronic device 10 while the foldable electronic device 10 is in a folded state. In some examples, the pivotable arm 240 may act as a securement mechanism that restricts and/or prevents the foldable electronic device 10 from moving to an unfolded configuration.

With reference to FIG. 11, as with the expandable device 100, when the user wishes to unfold the foldable electronic device 10, the user may pivot the pivotable arm 240 to the second configuration. In this second configuration, the pivotable arm 240 no longer restricts and/or prevents the foldable electronic device 10 from being unfolded, as the pivotable arm 240 provides ample clearance for the foldable electronic device 10 to move between folded and unfolded configurations as shown in FIG. 12. Upon the foldable electronic device 10 being unfolded, the pivotable arm 240 may be positioned in either the first configuration (FIG. 13) or the second configuration (FIG. 11) as desired. When the pivotable arm 240 is positioned in the first configuration, a user may grasp the button 210 to securely hold the foldable electronic device 10. Additionally, when the pivotable arm 240 is positioned in the second configuration, the pivotable arm 240 may serve as a kickstand to prop and/or retain the foldable electronic device 10 in an upright position.

Yet another example of an expandable device 300 coupled to a foldable electronic device is illustrated in FIGS. 14-18. It will be appreciated that the expandable device 300 illustrated in FIGS. 14-18 may include similar features to the expandable devices 100, 200, and accordingly, elements illustrated in FIGS. 14-18 are designated by similar reference numbers indicated in FIGS. 1-13 increased by 100 or 200. Accordingly, these features will not be described in substantial detail. Further, it is appreciated that any of the elements described with regards to the expandable devices 100, 200 may be incorporated into the expandable device 300.

The expandable device 300 does not include a pivotable arm. Rather, an elongated base member 332 is operably coupled to an elongated button 310 via any number of coupling portions 316. Each coupling portion 316 includes a collapsible and/or expandable mechanism or body 318 operably coupled to the button 310 that allows the button 310 to move between expanded and collapsed configurations.

The elongated base member 332 is operably coupled to a portion of the foldable electronic device 10 at a location (e.g., on the rear surface 12 at a location near a side surface 16) that does not interfere with movement of the foldable electronic device 10 between the unfolded and folded configurations. Accordingly, the user may configure the foldable electronic device 10 without repositioning the expandable device 300. As with the expandable devices 100, 200, a user may grasp the button 310 when positioned in an expanded configuration to securely hold the foldable electronic device 10. Additionally, when the button 310 is the expanded configuration, the expandable device 300 may serve as a kickstand to prop and/or retain the foldable electronic device 10 in an upright position.

In some instances, the expandable device of the current disclosure may at least partly take the form of a commercially available grip and stand product such as that available on www.popsockets.com. For example, U.S. Pat. No. 8,560,031, filed on Feb. 23, 2012; U.S. Pat. No. 9,970,589, filed on Nov. 9, 2017; U.S. application Ser. No. 15/615,900, filed on Jun. 7, 2017 (now U.S. Pat. No. 10,054,259); U.S. application Ser. No. 15/679,934, filed on Aug. 17, 2017 (now U.S. Pat. No. 10,060,573); U.S. application Ser. No. 15/803,410, filed on Nov. 3, 2017 (now U.S. Pat. No. 9,958,107); U.S. application Ser. No. 15/808,076, filed on Nov. 9, 2017 (now US U.S. Pat. No. 9,970,589); U.S. application Ser. No. 15/864,402, filed on Jan. 8, 2018 (published as US 2019/0138052); U.S. application Ser. No. 15/864,509, filed on Jan. 8, 2018 (now U.S. Pat. No. 10,463,116); U.S. application Ser. No. 15/906,920, filed on Feb. 27, 2018 (now U.S. Pat. No. 10,215,329); U.S. application Ser. No. 15/922,601, filed on Mar. 15, 2018 (now U.S. Pat. No. 10,030,807); U.S. application Ser. No. 15/952,025, filed on Apr. 12, 2018 (now U.S. Pat. No. 10,386,009); U.S. application Ser. No. 15/993,458, filed on May 30, 2018 (now U.S. Pat. No. 10,348,352); and U.S. application Ser. No. 16/001,723, filed on Jun. 6, 2018 (now U.S. Pat. No. 10,317,005) each describe suitable expandable grip and stand products, which also incorporate collapsible mechanisms and may form at least part of the disclosure herein, and therefore the entirety of each is hereby incorporated by reference.

Those skilled in the art will recognize that a wide variety of modifications, alterations, and combinations can be made with respect to the above described examples without departing from the scope of the invention, and that such modifications, alterations, and combinations are to be viewed as being within the ambit of the inventive concept.

The patent claims at the end of this patent application are not intended to be construed under 35 U.S.C. § 112 (f) unless traditional means-plus-function language is expressly recited, such as "means for" or "step for" language being explicitly recited in the claim(s).

What is claimed is:

1. An accessory for attachment to a mobile electronic device, the accessory configured to provide grip and kickstand functionality, the accessory comprising:
   a base member having a device-facing surface configured to detachably attach to a rear surface of the mobile electronic device or to a rear surface of a case of the mobile electronic device;
   a pivotable member coupled to the base member at a hinge portion, wherein the pivotable member extends from the hinge portion and is pivotable between at least a closed configuration and an open configuration, wherein the pivotable member comprises a base-facing surface and an opposite accessory-facing surface; and
   a grip detachably coupled to the accessory-facing surface of the pivotable member, wherein the grip is movable between an expanded configuration and a collapsed configuration,
   wherein at least a portion of the grip expands away from the accessory-facing surface of the pivotable member when moving from the collapsed configuration to the expanded configuration, and contracts towards the accessory-facing surface of the pivotable member when moving from the expanded configuration to the collapsed configuration.

2. The accessory of claim 1, wherein the pivotable member is configurable as a kickstand for the mobile electronic device when in the open configuration.

3. The accessory of claim 1, wherein the base-facing surface of the pivotable member faces the base member when the pivotable member is in the closed configuration.

4. The accessory of claim 3, wherein the base-facing surface of the pivotable member further contacts the base member when the pivotable member is in the closed configuration.

5. The accessory of claim 1, wherein the grip in the expanded configuration is configured to be grasped by a user to securely hold the mobile electronic device when the pivotable member is in the closed configuration.

6. The accessory of claim 1, wherein the grip comprises a top side, a bottom side, and a coupling portion, and wherein the top side of the grip expands away from the accessory-facing surface of the pivotable member when moving from the collapsed configuration to the expanded configuration, and contracts towards the accessory-facing surface of the pivotable member when moving from the expanded configuration to the collapsed configuration.

7. The accessory of claim 1, further comprising a securing mechanism configured to retain the pivotable member in the closed configuration.

8. An accessory for attachment to a mobile electronic device, the accessory configured to provide grip and kickstand functionality, the accessory comprising:
   a base member having a device-facing surface configured to detachably attach to a rear surface of the mobile electronic device or to a rear surface of a case of the mobile electronic device;
   a pivotable member coupled to the base member at a hinge portion, wherein the pivotable member extends from the hinge portion and is pivotable between at least a closed configuration and an open configuration, wherein the pivotable member comprises a base-facing surface and an opposite accessory-facing surface; and
   a grip detachably coupled to the accessory-facing surface of the pivotable member, wherein the grip is movable between an expanded configuration and a collapsed configuration,
   wherein the grip comprises an expandable mechanism which is configured to resiliently retain the grip in the closed configuration and expanded configuration, respectively.

9. The accessory of claim 8, wherein the pivotable member is configurable as a kickstand for the mobile electronic device when in the open configuration.

10. The accessory of claim 8, wherein the base-facing surface of the pivotable member faces the base member when the pivotable member is in the closed configuration.

11. The accessory of claim 10, wherein the base-facing surface of the pivotable member further contacts the base member when the pivotable member is in the closed configuration.

12. The accessory of claim 8, wherein the grip in the expanded configuration is configured to be grasped by a user to securely hold the mobile electronic device when the pivotable member is in the closed configuration.

13. The accessory of claim 8, wherein at least a portion of the grip expands away from the accessory-facing surface of the pivotable member when moving from the collapsed configuration to the expanded configuration, and contracts towards the accessory-facing surface of the pivotable member when moving from the expanded configuration to the collapsed configuration.

14. The accessory of claim 8, wherein the grip comprises a top side, a bottom side, and a coupling portion, and wherein the top side of the grip expands away from the accessory-facing surface of the pivotable member when moving from the collapsed configuration to the expanded configuration, and contracts towards the accessory-facing surface of the pivotable member when moving from the expanded configuration to the collapsed configuration.

15. The accessory of claim 8, further comprising a securing mechanism configured to retain the pivotable member in the closed configuration.

16. A combination grip and kickstand accessory for attachment to a mobile electronic device, the accessory comprising:
   a base member having a device-facing surface configured to detachably attach to a rear surface of the mobile electronic device or to a rear surface of a case of the mobile electronic device;
   a kickstand member coupled to the base member at a hinge portion, wherein the kickstand member extends from the hinge portion and is pivotable between at least a closed configuration and an open configuration, and wherein the kickstand member, in the open configuration, is configured to prop up and/or retain the mobile electronic device in a non-horizontal position; and
   a grip detachably coupled to an accessory-facing surface of the kickstand member, wherein the grip is movable between an expanded configuration and a collapsed configuration.

17. The combination grip and kickstand accessory of claim 16, wherein the kickstand member further comprises a base-facing surface opposite the accessory-facing surface, and wherein the base-facing surface of the kickstand member contacts the base member when the kickstand member is in the closed configuration.

18. The combination grip and kickstand accessory of claim 16, wherein the grip in the expanded configuration is configured to be grasped by a user to securely hold the mobile electronic device when the kickstand member is in the closed configuration.

19. The combination grip and kickstand accessory of claim 16, wherein at least a portion of the grip expands away from the accessory-facing surface of the kickstand member when moving from the collapsed configuration to the expanded configuration, and contracts towards the accessory-facing surface of the kickstand member when moving from the expanded configuration to the collapsed configuration.

20. The combination grip and kickstand accessory of claim 16, wherein the grip comprises a top side, a bottom side, and a coupling portion, and wherein the top side of the grip expands away from the accessory-facing surface of the kickstand member when moving from the collapsed configuration to the expanded configuration, and contracts towards the accessory-facing surface of the pivotable member when moving from the expanded configuration to the collapsed configuration.

21. The combination grip and kickstand accessory of claim 16, further comprising a securing mechanism configured to retain the kickstand member in the closed configuration.

\* \* \* \* \*